(12) United States Patent
Schäfer et al.

(10) Patent No.: US 9,040,152 B2
(45) Date of Patent: May 26, 2015

(54) PROFILED RETAINING SECTION FOR POSITIONING A SEAM CONNECTING TWO DECORATIVE LAYERS AND COMPOSITE PART COMPRISING A PROFILED RETAINING SECTION

(71) Applicant: Faurecia Innenraum Systeme GmbH, Hagenbach (DE)

(72) Inventors: Frank Schäfer, Steinweiler (DE); Wilfrid Bergeret, Marienthal (FR)

(73) Assignee: Faurecia Innenraum Systems GmbH, Hagenbach (DE)

( * ) Notice: Subject to any disclaimer, the term of this patent is extended or adjusted under 35 U.S.C. 154(b) by 0 days.

(21) Appl. No.: 13/679,827

(22) Filed: Nov. 16, 2012

(65) Prior Publication Data
US 2013/0130013 A1 May 23, 2013

(30) Foreign Application Priority Data

Nov. 17, 2011 (DE) ............ 10 2011 119 320

(51) Int. Cl.
*B60R 13/02* (2006.01)
*B60R 13/06* (2006.01)
*F16B 2/20* (2006.01)

(52) U.S. Cl.
CPC ............ *B60R 13/0206* (2013.01); *B60R 13/02* (2013.01); *B60R 2013/0281* (2013.01); *B60R 2013/0287* (2013.01); *B60R 2013/0293* (2013.01)

(58) Field of Classification Search
CPC ............... B60R 13/0206; B60R 13/02; B60R 2013/0293; B60R 2013/0287; B60R 2013/0281; B32B 3/06; B32B 37/06

USPC ............ 428/102, 223, 156; 156/308.2
See application file for complete search history.

(56) References Cited

U.S. PATENT DOCUMENTS 5,893,579 A * 4/1999 Kimura et al. ............ 280/730.2
2011/0227319 A1 9/2011 Stroeher et al.

FOREIGN PATENT DOCUMENTS

| DE | 6932808 U | 3/1972 |
| DE | 202010016550 U1 | 3/2011 |
| DE | 102010045719 | 3/2012 |
| EP | 2230132 | 9/2010 |
| WO | WO 2010105855 A2 * | 9/2010 |

OTHER PUBLICATIONS

Machine Translation of WO 2010105855A2. Sep. 2010.*

* cited by examiner

*Primary Examiner* — Maria Veronica Ewald
*Assistant Examiner* — Brian Handville
(74) *Attorney, Agent, or Firm* — Reising Ethington P.C.

(57) ABSTRACT

A profiled retaining section for positioning a seam connecting two decorative layers includes an upper region, a center region and a lower region forming at least one anchor. The upper region is designed as a piping, or in the manner of a piping, for protruding over a visible side of the skins to be positioned. The center region includes two sides to be sewn to the decorative layers. The anchor is designed to be introduced in a groove having a lesser width than the anchor itself and to exert a force on the groove in the lateral direction. The upper region, the center region and the anchor are integral with each other and arranged in the vertical direction relative to each other. Also described is a composite part that uses the profiled retaining section.

8 Claims, 2 Drawing Sheets

PROFILED RETAINING SECTION FOR POSITIONING A SEAM CONNECTING TWO DECORATIVE LAYERS AND COMPOSITE PART COMPRISING A PROFILED RETAINING SECTION

TECHNICAL FIELD

The invention relates to a profiled retaining section for positioning a seam connecting two decorative layers.

BACKGROUND

Such profiled retaining sections are already known from the prior art for the majority of seam shapes. EP 2 230 132 A1, for example, shows a profiled retaining section comprising a groove which extends in the longitudinal direction of the profiled section, with the end sections of two decorative layers being arranged in the groove and connected to each other.

However, profiled retaining sections according to the prior art cannot be used to position seams trimmed with piping in a simple and reliable manner.

A vehicle interior covering part comprising a seam trimmed with piping is disclosed in US 2011/0227319 A1, for example. However, a profiled positioning element to facilitate the positioning of the seam trimmed with piping is not provided. Instead, a seam tab, as is customary according to the prior art, is used for the piped seam shown there.

SUMMARY

It is therefore an object of the invention to make a profiled retaining section possible, which allows a seam comprising a piping, welting or the like to be positioning in a reliable and simple manner.

This and other objects may be achieved by a profiled retaining section according to claim 1 and by a composite part according to claim 5. Further embodiments will be apparent from the characteristics of the dependent claims.

The profiled retaining section according to an embodiment of the invention for positioning a seam connecting two decorative layers comprises an upper region, a center region and a lower region comprising at least one anchor. The upper region has a piping-like design or is designed in the manner of a piping for protruding over a visible side of the skins to be positioned. The piping, or the piping-like upper region, can comprise a core material which is surrounded by an outer layer which is placed around the core material and which is composed of a material that is different from the core material. However, the piping-like upper region can also be composed of a solid material (which is to say a continuous material having no division into an outer layer and core material). Particularly in embodiments with an upper region composed of a solid material, the upper region can comprise a convex cross section in a plane orthogonal to a length direction, i.e. every line between two points of the cross section of the upper region for its complete length runs in the cross section of the upper region and does not pass through any point which does not belong to the cross section of the upper region. A cross-section of the piping or of the piping-like upper region can, for example, be substantially circular or substantially oval. It should be pointed out that while the upper region may extend over the entire length of the profiled retaining section, this is not absolutely necessary. It is also possible for the upper region to extend only over a portion of the length of the profiled retaining section. However, the upper region may also extend over the entire length of the seam.

The center region has two sides and is designed to be connected, for example sewn, on each of the sides to one of the decorative layers. The anchor is designed to be introduced in a groove having a lesser width than the anchor itself, which is to say the anchor can be compressed in the lateral direction. The width of the anchor here shall be understood to mean the width of the anchor when the same is not introduced in a groove and not laterally compressed. When the anchor is pushed into a groove, it is laterally compressed and exerts a force on the groove in the lateral direction. In the profiled retaining section according to the invention, the upper region, the center region and the anchor are integrally designed with each other. The aforementioned regions are arranged offset from each other in the vertical direction.

The anchor, the upper region and/or the center region can be composed of a plastic material, and particularly of TPE-E. A material of which the anchor, the upper region and/or the center region can be at least predominantly composed can for example have a degree of hardness between 50 and 100 Shore A, between 70 and 95 Shore A, or between 80 and 90 Shore A. The degree of hardness can be approximately 85 Shore A, for example.

A particularly simple design of the profiled retaining section is possible if the upper region, the center region and the anchor are composed of the same (for example plastic) material. The integral design of the profiled retaining section from one material allows the profiled retaining section to be produced by way of extrusion, for example.

So as to enable as secure retention in a groove of a carrier as possible, the anchor can be designed so that it can be laterally compressed by at least 5%, and particularly at least 10% or 20%. The anchor can be compressible in the lateral direction in particular by up to 20% to 40%. The degree to which the anchor can be compressed can, for example, be adjusted by an angle at which the anchor runs relative to the vertical direction, a thickness of the anchor or a degree of hardness of the material. An angle of the anchor relative to the vertical direction preferably ranges between 100° and 150°, and still more preferably between 115° and 135°. The angle can be approximately 125°, for example.

So as to achieve a particularly marked decorative effect, the upper region can have a width between 3 and 8 mm.

In addition to a profiled retaining section, at least some embodiments of the invention relate to a composite part comprising a profiled retaining section, as described above, and at least two decorative layers, wherein the decorative layers are connected, for example sewn, to the center region of the profiled retaining section. The upper region of the profiled retaining section protrudes over a visible side of the surrounding decorative layer.

In one embodiment, the composite part further comprises at least one carrier, with the anchor of the profiled retaining section projecting into a groove of the carrier. In such embodiments, the anchor is compressed in the lateral direction. According to the principle of a spring, it thus exerts a force on the walls of the groove of the carrier in the lateral direction, whereby a non-positive connection is created, which prevents the anchor from being pulled out of the groove of the carrier.

The lateral direction within the scope of the present application shall be understood to mean the direction which is both perpendicular relative to the surface normal of the composite part and perpendicular relative to the longitudinal direction of the profiled retaining section. The longitudinal direction of the profiled retaining section is substantially identical to the direction of the seam. The direction of the surface normal of the visible surface of the composite part is defined as the vertical direction.

It is not absolutely necessary for the upper region of the profiled retaining section to protrude from the composite part. Instead, the carrier may also comprise a depression in which the seam runs—superimposed on the groove in which the profiled retaining section is disposed. The groove is provided at the bottom of the depression in such embodiments. This depression can be designed such that an upper edge of the upper region of the profiled retaining section ends flush in the vertical direction with the visible side of the decorative layers next to the depression. The upper edge of the upper region of the profiled retaining section can even be arranged so as to be lower in the vertical directions than the visible side of the decorative layers next to the depression.

Embodiments comprising, as described above, a flush or recessed upper edge of the upper region are useful especially in regions which are prone to wear, where otherwise abrasion would result in the upper region wearing quickly.

In contrast, so as to achieve as strong a decorative effect as possible, it is possible that the visible sides of the decorative layers are substantially level, or even slightly raised, in the immediate surroundings of the profiled retaining section.

Depending on the embodiment, the upper region can protrude from the visible surface of the composite part by 0.1 to 8 mm.

In some embodiments, an intermediate layer is disposed at least in some regions between the carrier and the decorative layers. This layer can, for example, be designed as a foam or textile layer. The intermediate layer gives the composite part soft haptic properties.

The composite part may comprise a folding region, in which the longitudinal direction of the profiled retaining section and the orientation of the visible side of the composite part change. The seam, the decorative layers and the profiled retaining section are guided around an edge of the carrier in the folding region.

So as to reduce the rigidity of the profiled retaining section, and thus allow the decorative layer to fold over without undulating, the height of the profiled retaining section may be reduced. For example, the height of the profiled retaining section can be decreased by at least 1 mm in the folding region. The anchor of the profiled retaining section can in particular be shorter or completely removed in the folding region. Likewise, the upper region can be removed, in particular in the folding region or in a portion of the folding region.

The length of the folding region can, for example, range between 10 mm and 40 mm, between 15 mm and 30 mm, or between 20 mm and 25 mm.

BRIEF DESCRIPTION OF THE DRAWINGS

Embodiments of the invention will be described in detail hereafter based on the figures. In the drawings.

DETAILED DESCRIPTION OF THE ILLUSTRATED EMBODIMENT(S)

Figure 1:
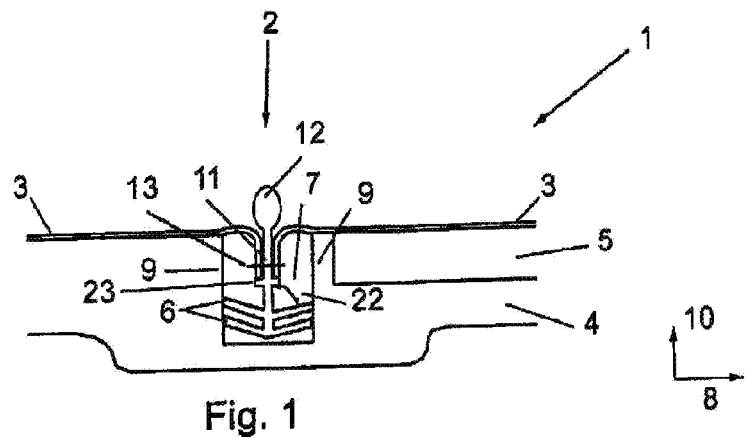
FIG. 1 is a cross-sectional view of one embodiment of a composite part comprising a profiled retaining section.

FIG. 1 shows a composite part 1, which comprises a profiled retaining section 2, two skins 3, a carrier 4 and an intermediate layer 5. The profiled retaining section 2 is arranged in a groove 7 of the carrier 4 with two anchors 6. Because of their arrangement in the groove 7, the anchors 6 are compressed in the lateral direction 8 and thus exert a restoring force on the lateral walls 9 of the groove 7. An angle 22 of the anchors relative to a vertical direction 10 and a material thickness of the anchors define the extent to which the anchors 6 can be compressed and how strong the force on the lateral walls 9 is. Static friction between the anchor 6 and the lateral walls 9 of the groove 7 thus counteract any sliding of the profiled retaining section 2 out of the groove 7. In the vertical direction, a center region 11 of the profiled retaining section 2 adjoins the anchor 6, this center region being delimited downward in the vertical direction by the uppermost anchor. The center region 11 is connected on both sides to a respective skin 3 (these can be molded skins made of plastic material, for example polyurethane or PVC; however, instead of the skins it is also possible to use textile and/or leather layers). The connection between the skins 3 and the center region 11 of the profiled retaining section 2 can be formed by a conventional seam 13 comprising at least one yarn. However, the connection can also be designed as an adhesive and/or welded seam. So as to ensure a correct position of the skins, in this exemplary embodiment a stop 23 is provided in the center region 11, the stop defining a position of a lower edge of the skins. This achieves a positioning accuracy of the skins of better than +/−1 mm, or even of better than +/−0.5 mm.

Offset in the vertical direction 10, the upper region 12 adjoins the center region 11, which is to say the center region 11 ends at a lower edge of the upper region 12, which is piping-like in the present embodiment. The upper region 12 protrudes over the visible side of the skins 3 and is thus easily visible for someone viewing the lining part 1. In this embodiment, the skins 3 are also arranged substantially level in the region around the profiled retaining section 2. The upper region 12 thus protrudes in a clearly visible manner.

In the present embodiment, the profiled retaining section is composed of TPE-E. However, any other, notably extrudable, plastic materials may also be used. In the present embodiment, the carrier 4 is produced from PP, PP-LGF, PP GF or ABS-PC. In a fiber-reinforced carrier material such as PP-LGF or PP GF, a fiber content can, for example, amount to between 10 and 50 percent by weight, and particularly between 20 and 40 percent by weight. A modulus of elasticity in tension of the material of the carrier is for example at least 1 GPa, and particularly at least 2 or 3 GPa. The modulus of elasticity in tension can also range between 4 and 12 GPa. The intermediate layer is arranged only on one side of the profiled retaining section 2 in this embodiment. However, it would also be possible for intermediate layers 5 to be arranged on both sides of the profiled retaining section 2, so that the entire lining part 1 has soft haptic properties. Likewise, the intermediate layer 5 could be dispensed with. The intermediate layer 5 can, for example, be composed of a textile, notably a knitted spacer fabric, or of a foam (for example a front and/or cut foam).

With regard to the materials and material properties of the profiled retaining section, of the carrier and of the intermediate layer, reference shall be made to the application published as EP 2 230 132 A1, which is hereby incorporated in the present application by reference with regard to the materials and material properties.

Figure 2:
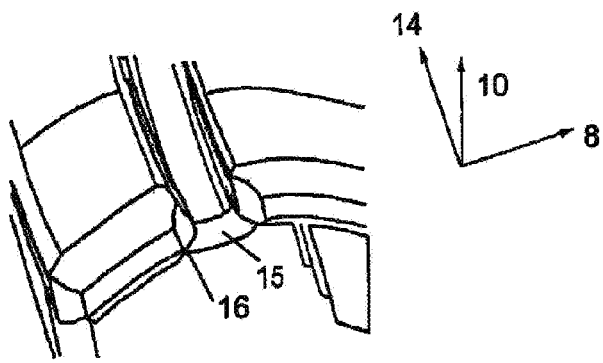
FIG. 2 shows a carrier comprising a groove introduced therein for introducing a profiled retaining section.

FIG. 2 shows a three-dimensional image of an exemplary embodiment of a carrier 4 comprising a groove 7. Along a large region in the longitudinal direction, the groove 7 has a groove base 7, which delimits the groove 7 downward. However, the groove 7 is open toward the bottom at an edge 16.

Figure 3:
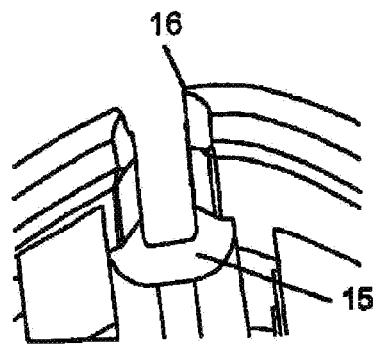
FIG. 3 shows a view of the carrier shown in FIG. 2 from beneath.

FIG. 3 shows the carrier 4 of FIG. 2 in the region of the edge 16 thereof from a perspective view from beneath. It is apparent that the groove base 15 is designed in an interrupted fashion in the surroundings of the edge 16. Because of the interrupted design of the groove base 15, a profiled retaining section 2 to be introduced in the groove 2 can be folded around the edge 16, including the skins 3.

Figure 4:
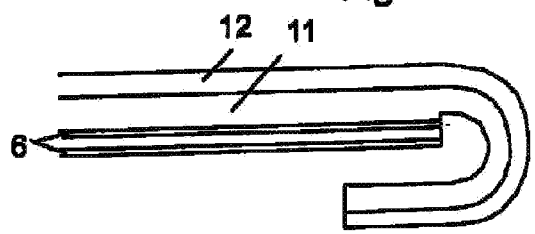
FIG. 4 is a longitudinal sectional view along an folded profiled retaining section.

FIG. 4 shows the profiled retaining section 2 in the folded state. Additional components of the composite part 1 were not taken into consideration in this illustration. In this view, the upper region 12, the center region 11 and the anchors 6 are apparent. The anchors of the profiled retaining section 2 were completely removed in the folding region 17. In an alternative embodiment, only one or some of the anchors 6 are removed. It shall be pointed out that the profiled retaining section 2 does not always have to comprise two anchors as shown, and instead a design comprising only one anchor, or more than two anchors, is also possible.

Reference is made to the German patent application with the application number DE 10 2010 045 719 with regard to the folding region, which is hereby incorporated by reference in the disclosure of the present application with regard to the designs of the carrier, of the groove of the carrier and of the anchor.

Figure 5:
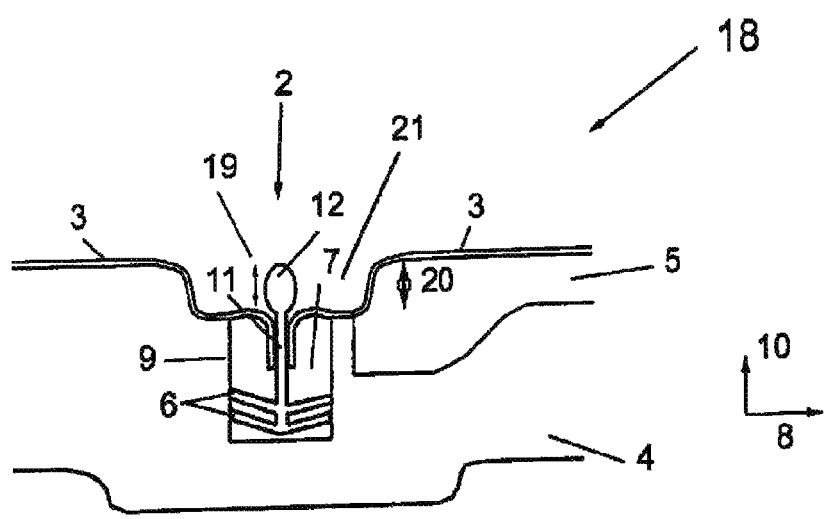
FIG. 5 shows an alternative embodiment of a composite part comprising a profiled retaining section.

Another embodiment of a lining part 18 is shown in FIG. 5. The lining part 18 differs from the lining part of FIG. 1 in that the profiled retaining section 2, and thus the connection between the skins 3, is arranged in a depression 21 of the composite part 18. While the upper region 12 thus protrudes over the visible side of the molded skins or decorative layers in the region of the connection of the skins, the upper region 12 does not protrude over the visible surface of the lining part 18 in this embodiment. This is because the upper region 12 has a height 19 which is less than a depth 20 of the depression 21. The embodiment according to FIG. 5 is preferred over the embodiment of FIG. 1 in terms of the abrasion resistance in the upper region 12, however the decorative effect attained by the upper region 12 is not as pronounced because of the recessed arrangement. The embodiment of FIG. 5 is thus suited in particular in regions of the composite part in which high mechanical stress, and notably strong abrasion, is to be expected.

The lining part shown in the figures can be used as a vehicle interior lining part, for example. The composite part 1 or 18 can form an instrument panel, for example, or be an integral part thereof.

The invention claimed is:

1. A profiled retaining section for positioning a seam connecting two decorative layers, comprising:
   an upper region,
   a center region wherein the center region is sandwiched between the two decorative layers, and
   a lower region comprising at least one anchor,
   such that the upper region comprises a piping, welting or weatherstrip that protrudes over a visible side of the decorative layers,
   wherein the center region comprises two sides sewn to the decorative layers, respectively,
   wherein the anchor may be received in a groove having a lesser width than the anchor itself and to exert a force on the groove in the lateral direction, and
   wherein the upper region, the center region and the anchor are unitary extensions of each other such that together they form a one-piece structure, are made of the same material, and are arranged in the vertical direction relative to each other.

2. A profiled retaining section according to claim 1, characterized in that the upper region has a width between 3 and 8 mm.

3. A composite part comprising a profiled retaining section according to claim 1 and at least two decorative layers, which are connected to the center region of the profiled retaining section.

4. The composite part according to claim 3, characterized in that the upper region protrudes over a surface formed by the decorative layers.

5. The composite part according to claim 3, characterized in that the anchor projects into a groove of a carrier, wherein the anchor is compressed laterally so as to exert a force on the lateral walls of the groove.

6. The composite part according to claim 5, characterized in that an intermediate layer is disposed at least in some regions between the carrier and the decorative layers.

7. A composite part according to claim 3, characterized in that the profiled retaining section and the decorative layers run in a curved manner out of the longitudinal direction in a folding region of the carrier.

8. The composite part according to claim 7, characterized in that the anchor has a shortened or completely interrupted design in the folding region.

* * * * *